(12) United States Patent
Glauber

(10) Patent No.: US 9,630,494 B1
(45) Date of Patent: Apr. 25, 2017

(54) METHOD AND APPARATUS FOR ANTICIPATORY ALL WHEEL AND FOUR WHEEL DRIVE ENGAGEMENT

(71) Applicant: FORD GLOBAL TECHNOLOGIES, LLC, Dearborn, MI (US)

(72) Inventor: Samuel Melville Glauber, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/949,316

(22) Filed: Nov. 23, 2015

(51) Int. Cl.
  *G06F 17/00* (2006.01)
  *B60K 23/08* (2006.01)
(52) U.S. Cl.
  CPC .... *B60K 23/0808* (2013.01); *B60K 2023/085* (2013.01)
(58) Field of Classification Search
  None
  See application file for complete search history.

(56) References Cited

U.S. PATENT DOCUMENTS

| | | | |
|---|---|---|---|
| 8,825,369 B2 | 9/2014 | Jin | |
| 8,958,965 B2 * | 2/2015 | Perkins | B60K 23/08 |
| | | | 701/1 |
| 9,061,679 B2 | 6/2015 | Maruyama et al. | |
| 9,096,127 B2 * | 8/2015 | Matsuzaki | B60W 10/06 |
| 9,346,460 B2 * | 5/2016 | Mansur | B60W 10/06 |
| 2012/0095659 A1 * | 4/2012 | Rodrigues | B60K 23/08 |
| | | | 701/69 |
| 2013/0103274 A1 | 4/2013 | Binder et al. | |
| 2014/0236443 A1 * | 8/2014 | Rodrigues | B60K 28/165 |
| | | | 701/69 |
| 2015/0142280 A1 | 5/2015 | Tamoto et al. | |

* cited by examiner

*Primary Examiner* — Dirk Wright
(74) *Attorney, Agent, or Firm* — Jennifer Stec; Brooks Kushman P.C.

(57) ABSTRACT

A system includes a processor configured to automatically engage all wheel drive (AWD) when a vehicle reaches areas along a route that were previously flagged as slippery, in a memory in communication with the processor. The flagging may have occurred, for example, based on existence of unpaved roads or precipitation at those areas.

20 Claims, 3 Drawing Sheets

METHOD AND APPARATUS FOR ANTICIPATORY ALL WHEEL AND FOUR WHEEL DRIVE ENGAGEMENT

TECHNICAL FIELD

The illustrative embodiments generally relate to a method and apparatus for anticipatory all wheel and four wheel drive engagement.

BACKGROUND

Vehicle customers often shop for all wheel drive (AWD) and four wheel drive (4WD) vehicles to better navigate slippery road conditions, but the extra mechanical couplings when these drive mechanisms are engaged reduce fuel economy. While systems exist to engage and disengage AWD and 4WD, these system require vehicle occupant action to do so. Because people are forgetful, this can lead to keeping AWD engaged which reduces fuel economy, or keeping 4WD engaged, which is undesirable at high speeds. On the other hand, a driver may forget to engage AWD or 4WD until a loss of vehicle control is experienced.

SUMMARY

In a first illustrative embodiment, a system includes a processor configured to automatically engage all wheel drive (AWD) in response to a vehicle GPS location.

In a second illustrative embodiment, a system includes a processor configured to automatically engage four wheel drive (4WD) in response to a vehicle GPS location corresponding to a pre-determined road type or weather condition associated with 4WD driving.

In a third illustrative embodiment, a system includes a processor configured to automatically engage all wheel drive (AWD) when a vehicle reaches areas along a route that were previously flagged as slippery, in a memory in communication with the processor, based on existence of unpaved roads or precipitation at those areas.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
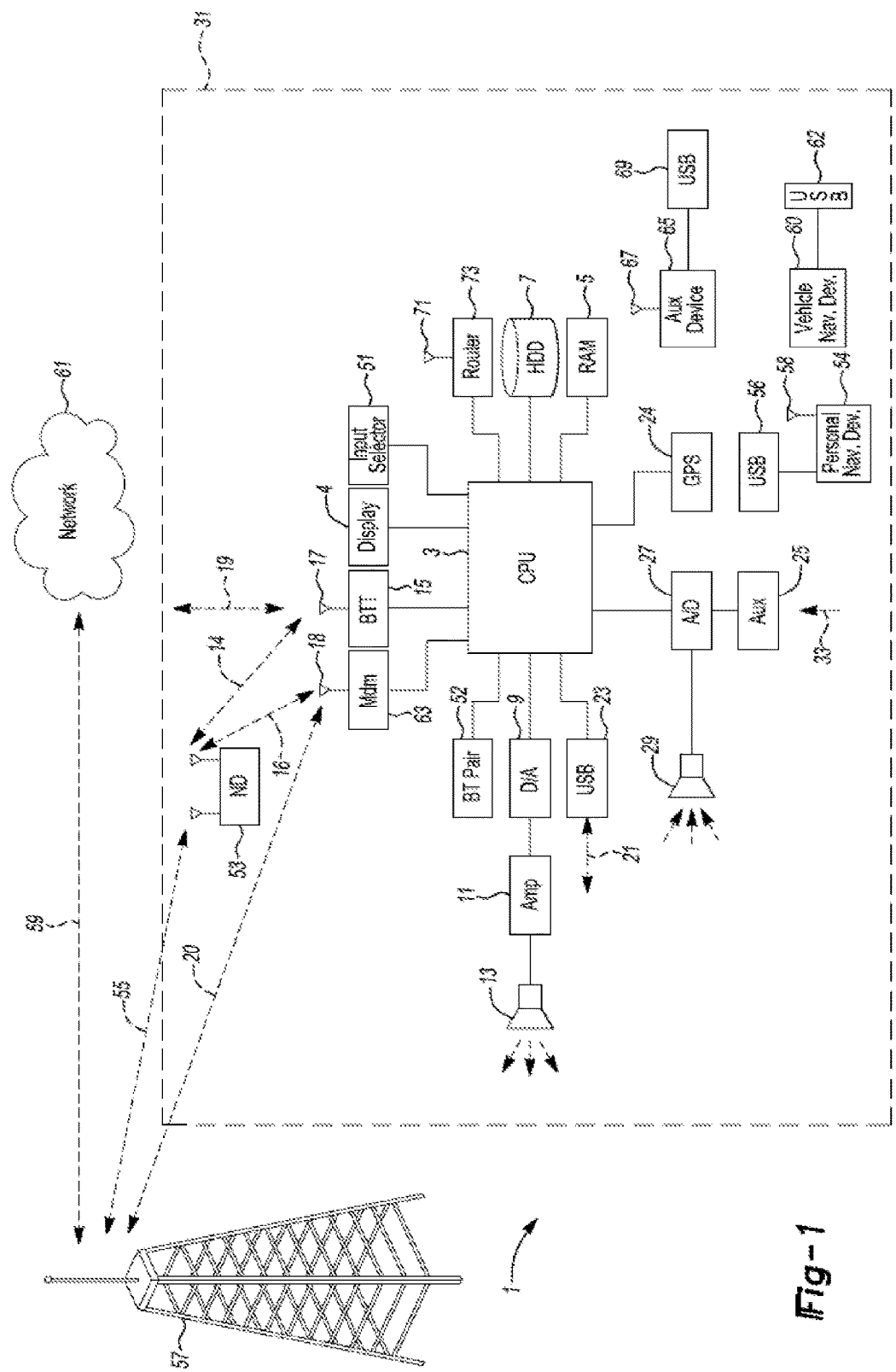
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 Mbps for stationary or walking users and 385 kbps for users in a moving vehicle. 3G standards are now being replaced by IMT-Advanced (4G) which offers 100 Mbps for users in a vehicle and 1 Gbps for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Many vehicles come with a variety of traction control modes that dictate how power is delivered from all wheel drive. The illustrative embodiments propose methods and apparatuses for selectively engaging and disengaging those modes. Although all wheel drive is typically "always on" in some manner, it may also be possible to design a vehicle in which all wheel drive can itself be disengaged to improve fuel economy, if desired.

Because users may forget to engage AWD or 4WD until it is too late, or forget to disengage these systems when no longer needed, the illustrative embodiments propose examples of methods and systems to automatically engage these systems when needed (or just before needed in an anticipatory manner). A telematics system receives global positioning system (GPS) data and compares it both to existing road maps and real-time or near real-time precipitation data from a weather service. The first comparison checks to see what type of road on which the vehicle is traveling (paved, unpaved, or, with higher detail maps, concrete, brick, gravel, dirt, asphalt, etc.). If the check fails (e.g., in this case, if the vehicle is on an unpaved road), the powertrain control module (PCM) commands the engagement of AWD, to assist in travel on the unpaved road. When the check returns indicia that the vehicle has returned to a paved road, AWD is automatically disengaged (assuming the check below doesn't result in continued engagement).

The second check identifies if the vehicle is entering a section of road that is or has recently experienced precipitation. If the road is likely wet or slippery (based on precipitation data), the powertrain control module again engages AWD until the vehicle moves out of the slippery area. If the vehicle is kept below a speed threshold, 4WD may be engaged instead of AWD.

The second check may be run under a variety of conditions. In one example, the system can continually examine roads around a vehicle position, so that a few blocks in any direction are examined. This may be useful if no route is entered, so that a system can be engaged to assist travel regardless of the direction in which the vehicle travels, if the vehicle travels towards a road that may be difficult to navigate.

In another example, the system can begin examining roads when a weather alert (indicating snow, sleet, hail, rain, icy conditions, etc.) is received by the system. This is useful to reduce pinging frequency of a weather service for weather data to reduce bandwidth requirements and data transfer.

In still another example, the system examines some or all of an upcoming portion of a route, which assumes that the vehicle will travel along the planned route. This can be combined with either of the above examples as well, either examining roads surrounding the route and/or doing the examining when a weather alert is issued for either a present area or a region along the route. This can be useful for identifying areas along the route where AWD or 4WD may assist the driver in travel.

Figure 2:
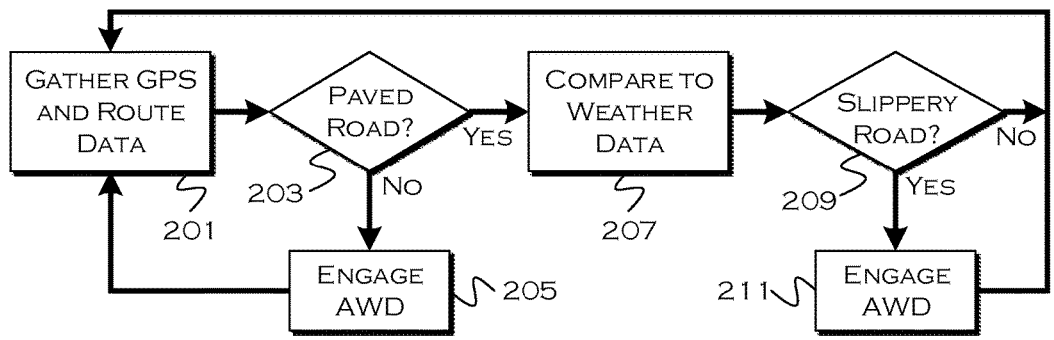
FIG. 2 shows an illustrative example of a process for automatically and/or anticipatorily engaging all wheel drive (AWD)

FIG. 2 shows an illustrative example of a process for automatically and/or anticipatorily engaging all wheel drive (AWD). With respect to the illustrative embodiments described in this figure, it is noted that a general purpose processor may be temporarily enabled as a special purpose processor for the purpose of executing some or all of the representative methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process gathers both vehicle GPS data showing a present vehicle location (and possibly speed, heading, etc.) and route data 201. The GPS data can be used to compare the vehicle location to a map database of road types, to determine what type of road on which the vehicle is traveling. This could be a basic determination of paved/unpaved 203, or could be a more advanced version if differing road types are available (e.g., without limitation, cobblestone, gravel, dirt, brick, concrete, asphalt, etc.). Different states of AWD and 4WD may be appropriate at varied speeds on varied road types, so the more road data available the better the decision the vehicle computer can make about the type of drive to be engaged.

If the road is unpaved 203, the process can engage AWD automatically 205. This can persist as long as the road remains unpaved. Once the road is again paved 203, the process can proceed to utilizing weather checks to see if AWD should be engaged 207.

The current GPS location is compared to weather data, which can include weather data for a previous predetermined amount of time (which could vary based on, for example, temperature). If the temperature was 95 degrees, any precipitation would likely rapidly evaporate from a paved road, so it's possible that only a previous 30 minutes of weather data may be considered. If the temperature was 0 degrees, on the other hand, precipitation in the form of ice or snow on the road may persist for a long period of time, so several hours of previous weather data (or more) may be examined. Current weather data and future forecast data may also be examined.

If the weather data indicates that the conditions may be slippery 209, AWD may be engaged 211. Otherwise, the process may continue to check for unpaved roads and/or slippery conditions. When no unpaved road and no slippery conditions are present, the process may disengage the AWD 213. In this manner, AWD is automatically engaged and disengaged as predicted to be needed, and the driver can continue on without having to remember to turn the system on and off (unless it is desired for some reason—if it is manually engaged, the "disengage" step can be skipped until it is manually disengaged).

Figure 3:
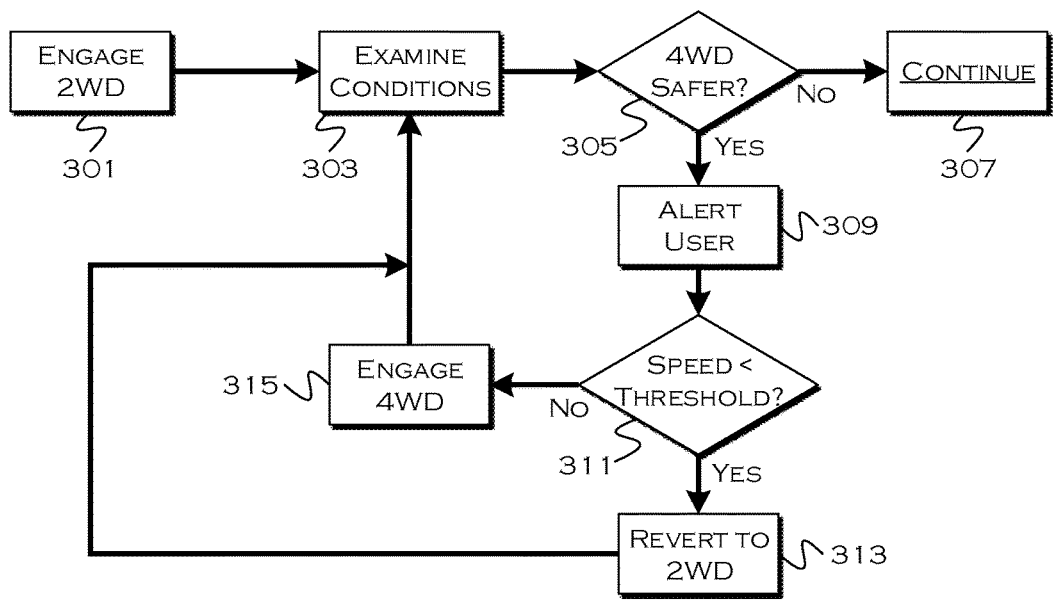
FIG. 3 shows an illustrative example of a process for automatically and/or anticipatorily engaging four wheel drive (4WD)

FIG. 3 shows an illustrative example of a process for automatically and/or anticipatorily engaging four wheel drive (4WD). With respect to the illustrative embodiments described in this figure, it is noted that a general purpose processor may be temporarily enabled as a special purpose processor for the purpose of executing some or all of the methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This process shows an example where 4WD drive may be alternatively engaged. In this example, 2WD has been engaged as the result of an ambient or operating condition 301. The process then examines the severity of the environmental conditions 303 (which can include both road type, weather and any other controlling factors that could be mitigated by 4WD). In this process, a determination is made as to whether or not 4WD would be better than 2WD for the given set of current conditions 305. If the conditions only dictate a need for 2WD (which allows driving at a significantly higher speed), the process can continue with periodic rechecks for 4WD engagement. This 4WD crossover can be run whenever 2WD is engaged and constantly or periodically throughout the 2WD engagement.

If 4WD would be better, the vehicle must be under a certain speed to avoid damage to the powertrain. In such a case, the system alerts the user that 4WD is preferable 309. This could be, for example, an audible alert through speakers, a visual alert through a vehicle display or instrument panel, or some combinatorial form of both. Once the speed is dropped below the minimum threshold 311 (which can be indicated as part of the alert, so the user knows to what speed to slow the vehicle), the process can engage 4WD 315.

Once 4WD is engaged, if, at any point, the vehicle speed rises above the threshold for 4WD 311, the process can revert to 2WD 313 to avoid damage to the vehicle powertrain. At this point, and/or if the speed is initially too high, the process can continue to examine the need for 4WD and engage the 4WD whenever conditions and speed make it desirable to do so.

Figure 4:
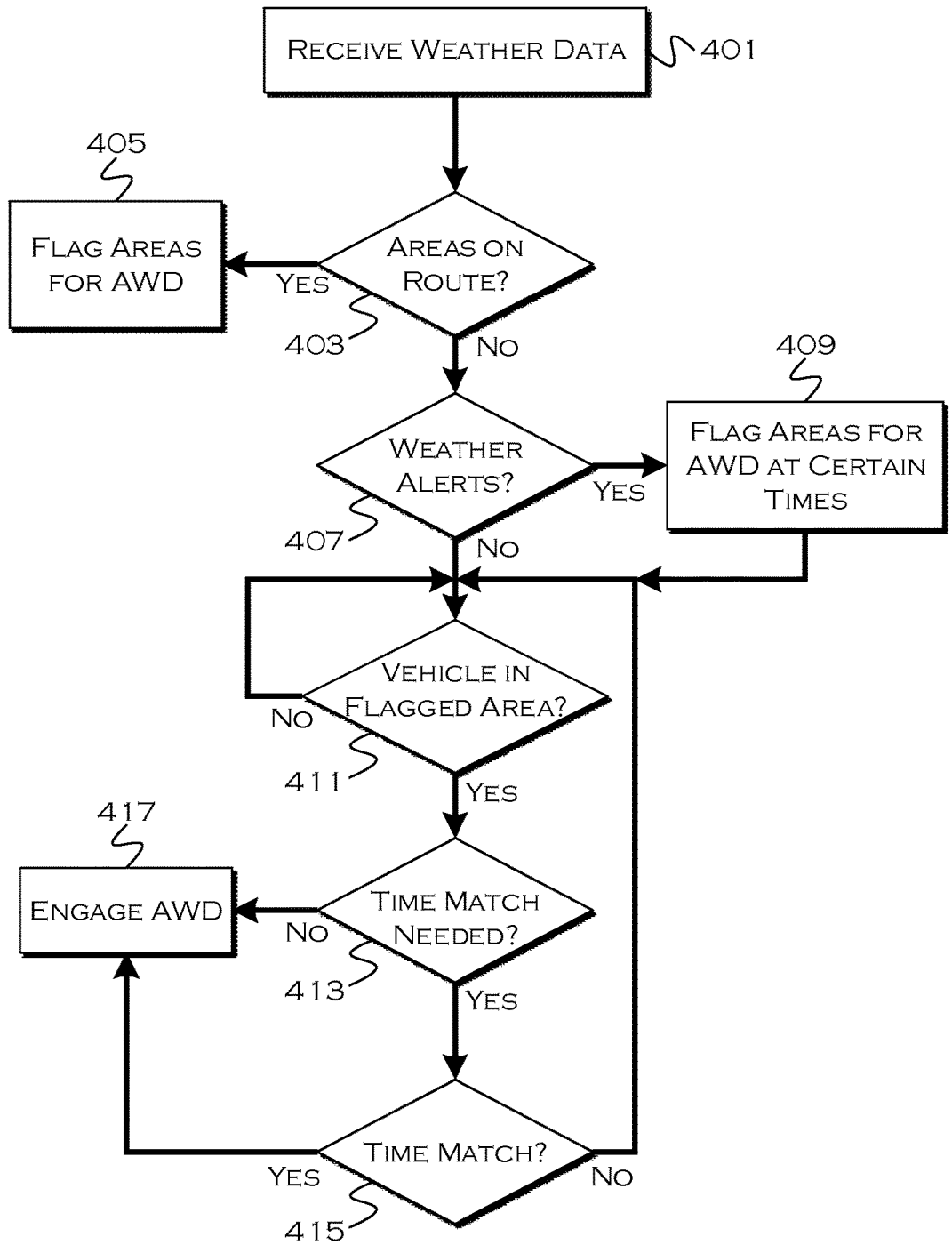
FIG. 4 shows an illustrative example of predicting and engaging AWD along a route.

FIG. 4 shows an illustrative example of predicting and engaging AWD along a route. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process receives weather data 401. This data will be used to determine if AWD and/or 4WD should be automatically engaged or disengaged. In this example, the process will determine data for a route ahead, which can allow engagement of AWD or 4WD before a slippery or dangerous condition is actually encountered. Since icy or slick conditions can cause a loss of control almost immediately after encounter, this may allow for engagement prior to even an initial encounter.

Any areas on the route that correspond to gravel, dirt or otherwise unpaved roads will first be considered 403. For each of these areas, a flag will be set 405, and some predetermined distance or time prior to reaching these areas, the process can engage AWD. Also, this flagging can include the flagging of any areas that are currently or have already experienced some form of precipitation that could cause dangerous conditions. The flag could also be set for these regions, so that AWD/4WD can be engaged some period of time prior to encountering the conditions.

The process also checks to see if any weather alerts (indicating possible upcoming weather over regions of the route) are present for the time during which the vehicle is projected to be in travel 407. If there are any weather alerts for any regions of the route, the process may flag those areas for AWD or 4WD consideration 409. In this example, the process also includes a timestamp in the flag. The timestamp can be useful because the weather may not be projected to occur until a certain time (so that if the region is encountered prior to this time, no AWD/4WD may be needed).

If and when the vehicle encounters a flagged area 411, the process can check to see if there is a timestamp associated with the area 413. If there is no timestamp, the process can engage AWD just prior to the vehicle entering the flagged area (which could be, for example, geo-fenced to set a border around the area). Alternatively, for example, a point along the route could be set at which AWD is to be engaged, and another point at which AWD is to be disengaged. As shown in FIG. 3, if 4WD is preferable to AWD, the process can recommend slowing the vehicle at some point before which 4WD is to be engaged. Also, if desired, just prior to engaging either drive type, the process could re-check to determine if any predicted need is, in fact, still predicted to be necessary.

This planning process can assist in identifying areas of AWD/4WD need/desirability long before those areas are encountered. Also, since weather reports (and routes) change, the process could be run intermittently or periodically. In one example, the process is re-run upon issuance of a weather-change notice for a region in which the vehicle is traveling. In another example, the process is re-run if and when the vehicle travels off an original route. In still other examples, the process is simply run at predetermined intervals.

The illustrative embodiments provide systems and methods through which AWD and 4WD can be engaged without explicit user instruction, which allows for greater utilization of these features, while at the same time reducing any potential fuel economic affect and/or any potential damage to the powertrain resulting from use of 4WD at excessive speeds.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
automatically engage all wheel drive (AWD) in response to a vehicle GPS location.

2. The system of claim 1, wherein the AWD is automatically engaged based on the GPS location corresponding to an unpaved road.

3. The system of claim 1, wherein the AWD is automatically engaged based on the GPS location corresponding to a point of known present precipitation.

4. The system of claim 1, wherein the AWDS is automatically engaged based on the GPS location corresponding to a point of known prior precipitation within a threshold time period.

5. The system of claim 4, wherein the threshold time period varies inversely with temperature, such that lower temperatures result in longer threshold time periods.

6. The system of claim 1, wherein the processor is configured to automatically disengage the AWD in response to the vehicle GPS location corresponding to a specified road type or weather condition.

7. The system of claim 6, wherein the road type includes a paved road.

8. The system of claim 6, wherein the weather condition includes no present precipitation and no precipitation within a threshold time period.

9. A system comprising:
a processor configured to:
automatically engage four wheel drive (4WD) in response to a vehicle GPS location corresponding to a predetermined road type or weather condition associated with 4WD driving.

10. The system of claim 9, wherein the processor is further configured to recommend slowing below a threshold speed prior to automatically engaging 4WD.

11. The system of claim 10, wherein the processor is configured to engage AWD until the speed is below the threshold.

12. The system of claim 10, wherein the processor is configured to engage 4WD when the vehicle speed drops below a threshold.

13. The system of claim 9, wherein the road type includes an unpaved road.

14. The system of claim 9, wherein the weather condition includes precipitation at a present vehicle GPS location.

15. The system of claim 9, wherein the weather condition includes precipitation at a previous time within a predetermined time threshold at a present vehicle GPS location.

16. A system comprising:

a processor configured to:

automatically engage all wheel drive (AWD) when a vehicle reaches areas along a route that were previously flagged as slippery, in a memory in communication with the processor, based on existence of unpaved roads or precipitation at those areas.

17. The system of claim 16, wherein the processor is configured to engage AWD a predetermined time before the vehicle reaches a flagged area.

18. The system of claim 16, wherein the processor is configured to engage AWD a predetermined distance before the vehicle reaches a flagged area.

19. The system of claim 16, wherein the processor is configured to automatically engage four wheel drive (4WD) when a vehicle reaches areas along a route that were previously flagged as 4WD-appropriate, based on existence of unpaved roads or precipitation at those areas, determined to be severe enough that 4WD is determined to add more control than AWD, and when a vehicle speed is below a 4WD threshold at which powertrain damage will not occur.

20. The system of claim 19, wherein the processor is configured to recommend lowering vehicle speed to the 4WD threshold prior to reaching the areas flagged as 4WD-appropriate.

* * * * *